Sept. 11, 1956 R. C. INGRAHAM 2,762,956
SEMI-CONDUCTOR DEVICES AND METHODS
Filed July 19, 1952 2 Sheets-Sheet 1

INVENTOR
ROBERT C. INGRAHAM
BY Paul S. Martin
ATTORNEY

Sept. 11, 1956 R. C. INGRAHAM 2,762,956

SEMI-CONDUCTOR DEVICES AND METHODS

Filed July 19, 1952 2 Sheets-Sheet 2

INVENTOR
ROBERT C. INGRAHAM
BY Paul S. Martin
ATTORNEY

United States Patent Office 2,762,956

Patented Sept. 11, 1956

2,762,956

SEMI-CONDUCTOR DEVICES AND METHODS

Robert C. Ingraham, Danvers, Mass., assignor to Sylvania Electric Products Inc., a corporation of Massachusetts Application July 19, 1952, Serial No. 299,805

2 Claims. (Cl. 317—235)

The present invention relates to fabrication of semi-conductor devices, including devices of this class having multiple rectifying contacts and like rectifying contact semi-conductor devices, and to such semi-conductor devices as products.

Rectifying-contact devices usually embody one or more point contact elements in proper pressure contact with a semi-conductor element, the respective elements being mounted on supporting leads extending in the same or opposite directions from the contact region. In a typical "single-ended" construction, that is, one in which the supporting leads extend in the same direction, the leads are integrally molded with an insulating base or button and have one group of ends available adjacent one side of the base for use as terminal pins or as terminal wires, while the other group of ends is accessible from the other side of the base for connection to the contact elements and the semi-conductor element.

It is an object of the present invention to provide semi-conductor devices of a simplified physical construction facilitating initial arrangement of the contact elements and semi-conductor elements. In particular, one aspect of the present invention resides in the provision of novel semi-conductor devices of a "single-ended" construction.

In accordance with a further aspect of the present invention, an improved method is provided for the routine and orderly manufacture of translators and transducers, particularly for semi-conductor devices where the supporting leads or terminals extend in the same direction from the contact region.

The nature of the invention will be better appreciated from the following detailed description of several illustrative embodiments, when taken in conjunction with the drawing, wherein.

Figure 1:
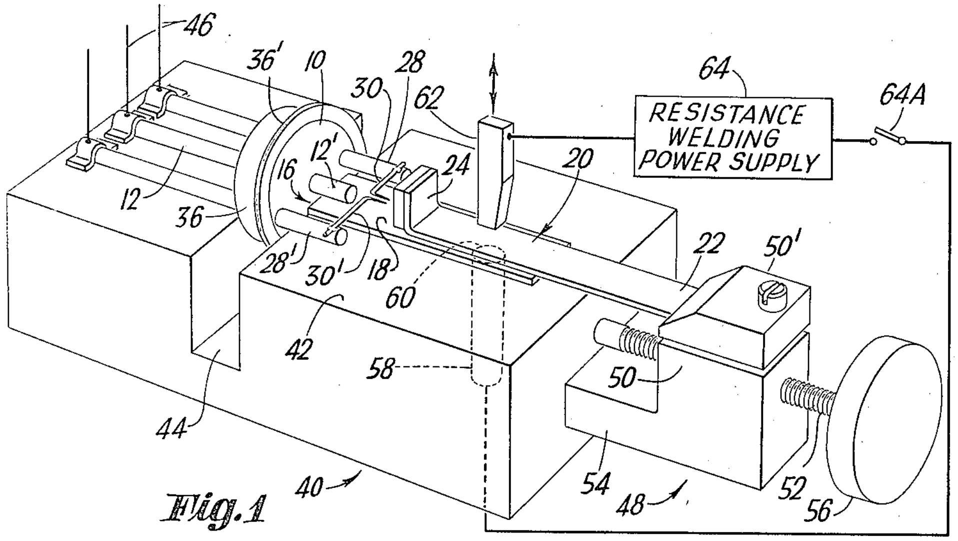
Fig. 1 is a simplified perspective view showing a partially assembled illustrative transistor unit embodying features of the present invention and supported in an adjusting fixture.
Figure 2:
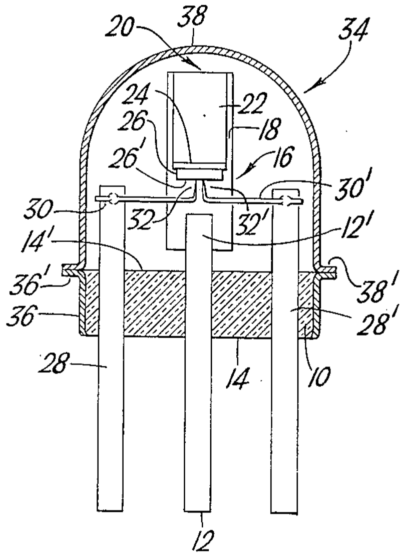
Fig. 2 is an elevational view, partly in cross-section, of the transistor unit shown in Fig. 1, after completion.
Figure 3:
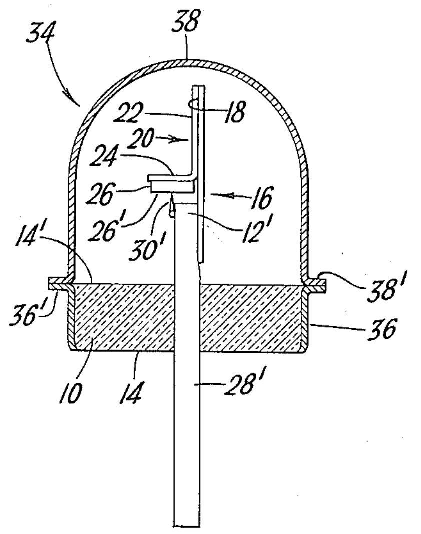
Fig. 3 is an elevation, partly in cross-section, at right angles to the view of Fig. 2.

Referring now to the drawing there is shown in Figs. 1 to 3 one form of a "single-ended" construction of a semi-conductor device embodying features of the present invention. Although the invention has been illustrated as of special merit in connection with a transistor unit or semi-conductor triode, it is to be expressly understood that other applications are contemplated as, and, for example diodes for rectification and photo detectors. Specifically, and as seen in Figs. 2 and 3, an insulating base or circular button 10, such as the glass type commonly used in the assembly of radio tubes has molded therein a centrally disposed lead 12 arranged axially of the base 10 and projecting from the opopsite faces or sides 14, 14′ of the base. The end of the lead 12 projecting from the face 14′ of the base 10 carries an elongated plate 16 extending substantially normal to the face 14′ of the base thereof. Plate 16, in the form of an elongated flat rectangular plate, may be integral with the lead 12 or united thereto by soldering or welding at the terminal end 12′ of the lead 12 which overlies the adjacent end of the plate 16.

This plate includes a vertically extending plane guide surface 18 against which abuts a support 20, illustrated as a right-angle bracket having a long leg 22 abutting against the guide surface 18 and fixed thereto and a short leg 24 carrying a semi-conductor element 26, usually an etched and polished chip of crystalline germanium.

The base 10 is additionally molded with a pair of spaced leads 28, 28′ arranged parallel to and aligned on opposite sides of the lead 12. Leads 28, 28′ include ends projecting from the under or lower face 14 of the base which, along with the adjacent end of lead 12, serve as plug-in pins or wiring terminals for connection in the desired circuits. The ends of the leads 28, 28′ projecting from the face 14′ of the base 10 carry point contact elements 30, 30′ formed of transversely extending resilient whiskers of appropriate metals and having prepared pointed ends 32, 32′ disposed in a common plane and in contact with the adjacent prepared surface 26′ of the semi-conductor body 26. The prepared points 32, 32′ are laterally spaced and aligned and in critical pressure engagement with the semi-conductor element 26, as seen in Fig. 3. The prepared points 32, 32′ are arranged in a plane and exert thrust in a line offset and parallel to the guide surface 16 and in position for contact with the semi-conductor surface 26′ which is arranged normal to the plane of the point-contact elements and the guide surface 16.

A suitable enclosure 34 is provided for the electrically completed transistor unit. The illustrative enclosure includes a circular rim or ring 36 integrally molded with the base 14 and having an outwardly turned flange or lip 36′, and a downwardly opening dome-shaped cover 38 having an outwardly turned flange or lip 38′. The flanges 36′, 38′ of the rim and cover 36, 38 are substantially coextensive and are seam welded or soldered together to seal the semi-conductor and point contact elements against the atmosphere. It is to be noted that a hermetically sealed unit is provided since the leads 12, 28, 28′ are sealed in the base 14 and likewise preclude the possibility of leakage and consequent deleterious attack on the germanium chip.

In making semi-conductor devices such as the illustrative transistor of Figs. 2 and 3 an adjusting fixture of the type illustrated in Fig. 1 is preferably employed for initially adjusting the point contact and semi-conductor elements and securing the same in proper mutual contact with each other. The adjusting fixture includes a block 40 having a supporting surface 42 upon which the pin leads 12, 28, rest. The block 40 is formed with a transverse slot 44 dimensioned to receive the circular base or button 10 with the terminal or pin portions of the leads projecting from the face 14 toward one end of the block and with the element supporting portions of the leads extending toward the opposite end of the block. Suitable contacts 46 are provided to receive the terminal or pin portions of the leads, the contacts being connected to apparatus (not shown) for concurrent electrical testing of the devices being processed. Disposed adjacent the end of block 40 remote from the contacts 46 is a clamp 48 including fixed and movable jaws 50, 50′ adapted to receive therebetween the long leg 22 of the support 20 for the semi-conductor 26. The clamp 48 is mounted on a feed screw 52 .and guide 54 for movement toward and away from the adjusting fixture block 40. A suitable operating knob 56 is connected to the feed screw 52 for effecting the adjustment of the clamp to thereby longitudinally displace the support or bracket 20 relative to the base 10 received within the slot 44. The adjusting fixture block 40 carries a fixed welding electrode 58 including an end bearing surface 60 substantially coplanar with the supporting surface 42. The welding electrode 58 forms part of a resistance welder constructed and arranged in accordance with principles and practices well understood per se. In the interests of simplicity the resistance welding equipment has been diagrammatically illustrated to include a movable electrode 62 which may be displaced toward and away from the fixed electrode 58, the respective electrodes being connected to a suitable resistance welding power supply 64.

Semi-conductor devices, such as the illustrative transistor unit, are processed in substantially the following manner: The circular insulating base 10 is integrally molded with the retaining ring 36 and with the aligned pin leads 12, 28, 28'. This molding operation may conveniently be carried out on a header forming machine and provides an end closure for the completed transistor unit which may be hermetically sealed subsequently by properly joining a closure to the outwardly turned rim 36' of the ring 36. The leads of the header are cut to prescribed lengths and the plate 16 is secured to the axially-disposed short lead 12 with the guide surface 18 of the plate 16 arranged substatnially in the plane defined by the peripheries of the aligned leads. Plate 16 serves as a pedestal to fix the location of the semiconductor element, and to aid in dissipation of heat developed in operation of the device. Thereafter the whiskers or point-contact elements 30, 30' are rigidly secured transversely of the leads 28, 28' in a plane substantially coextensive with a plane defined by the peripheries of the leads on the side remote from the guide surface 18. Accordingly, the point-contact elements 30, 30' are arranged in a plane offset from and parallel to the guide surface 18, the amount of offset being determined by the diameter of the respective leads. The whiskers 30, 30' are preferably secured by spot welding and the prepared points 32, 32' properly aligned and spaced with the aid of magnifying shadowgraph equipment or the like.

Thereafter the base 10 is inserted within the slot 44 with the terminal portions of the leads 12, 28, 28' in engagement with the contacts 46, the leads being properly positioned longitudinally of the supporting surface 42 due to engagement of the base 10 with a wall of the slot 44. Thereafter the long leg 22 of the support or bracket 20 carrying the semi-conductor element 26 is clamped between the fixed and movable jaws 50, 50' of the clamp 48. The long leg 22 of the bracket is laterally confined against the guide surface 18 of the plate 16 by tip 62 of the welder 64 which is not energized at this time. Thereupon rotational movement of the feed screw 52 by turning the operating knob 56 will effect a movement of the clamp 48 toward the block 44 and consequent adjustment of the semi-conductor element 26 toward the previously adjusted points 32, 32' of the point contact elements 30, 30'. When proper pressure contact is obtained between the semi-conductor and point contact elements, the support 20 is mechanically united to the underlying plate 16 by closing switch 64A of the resistance welding equipment. After welding, the electrically completed unit may be removed from the adjusting fixture, whereupon the unneeded portion of the bracket 20 extending beyond plate 16 may be cut away at a location outwardly of the weld. The unit is then encased by placing the cover 38 about the adjusted elements and soldering or seam welding the coextensive flanges 36', 38' of the rim 36 and cover 38 to each other.

Figure 6:
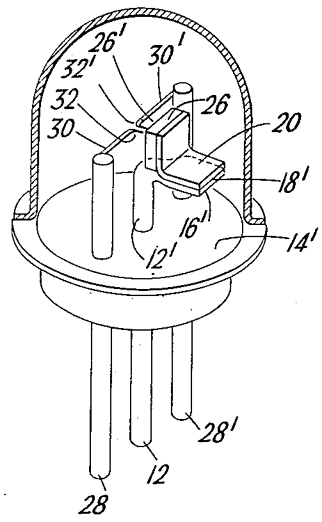
Fig. 6 is a perspective view of the modified transistor unit of Fig. 5.
Figure 5:
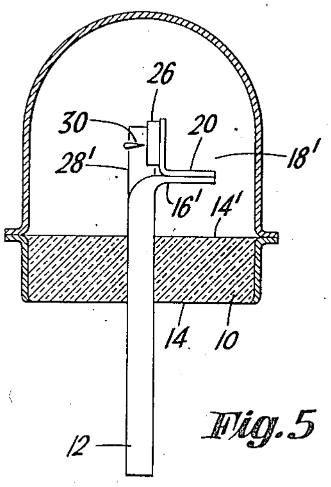
Fig. 5 is an elevational view of the transistor unit of Fig. 4, as completed.

Referring now to Figs. 5 and 6, there is shown a modified transistor unit illustrative of a "single-ended" construction embodying further features of the present invention. Specifically the pedestal 16' is formed integrally with the axially-disposed lead 12 by flattening a terminal portion of the lead and bending the terminal portion at right angles to the major portion of the lead. The integral pedestal 16' is formed with a guide surface 18' substantially parallel to the opposite faces 14, 14' of the base 10. In order to properly contact the semi-conductor element 26 which is supported on the right angle bracket 20, the whisker or point contact elements 30, 30' are arranged with their pointed ends 32, 32' in a plane substantially parallel to and offset from the guide surface 18'.

Figure 4:
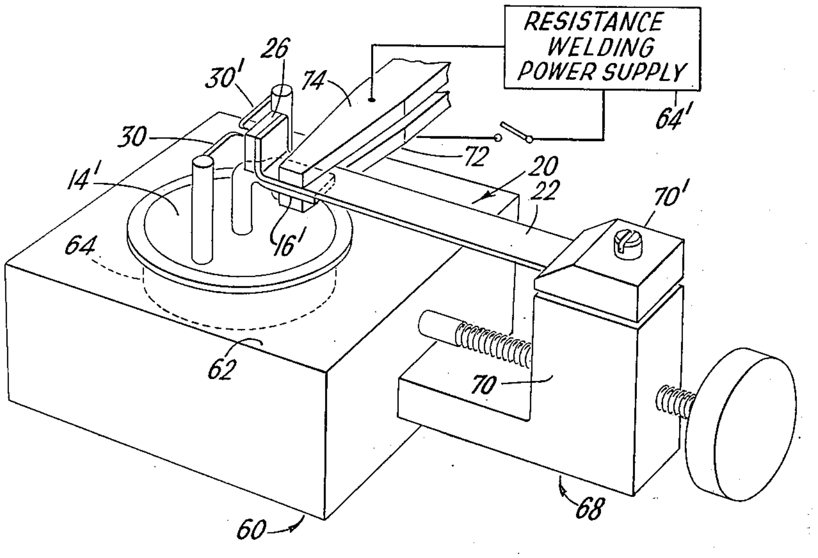
Fig. 4 is a perspective view showing a modified and partially assembled transistor unit embodying further features of the present invention and supported in a suitable adjusting fixture.

As seen in Fig. 4, a fixture suitable for the upright assembly of the transistor unit includes a block 60 having a supporting surface 62 which is provided with a suitable circular socket 64 to accommodate the circular base 10 with its upper face 14' substantially flush with the surface 62. Suitable contacts, not shown, are provided for the socket 64 so that upon insertion of the base therein, the respective terminal portions of the leads 12, 28, 28' may be connected to suitable apparatus (not shown) for concurrent electrical testing. A clamp 68 adjustable relative to the block 60 is supported on the fixture and includes fixed and movable jaws 70, 70' to receive therebetween the long leg 22 of the bracket 20. Since the pedestal 16' is spaced above the supporting surface 62 of the block 60, a somewhat modified form of equipment for welding and for confining leg 20 against pedestal 16' must be employed. As illustrated, welding tweezers 72, 74 are arranged to engage opposite sides of the superposed bracket 20 and pedestal 16', the welding tweezers being connected to the conventional power supply 64'.

The illustrative transistor unit of Figs. 5 and 6 is processed in substantially the following manner: The integrally molded circular base or header is formed with leads 12, 28, 28', the lead 12 being flattened to form the pedestal 16' with the guide surface 18' after molding of the header. Thereafter substantially the same steps are followed as previously described except that the whisker elements 30, 30' are secured in a contact plane parallel to the guide surface 18' which is now substantially parallel to the opposed faces 14, 14' of the base, as contrasted to the construction of Figs. 1 to 3, wherein the guide surface 18 was normal to the faces 14, 14' of the base 10.

In both devices of Figs. 1 and 4, spring bias may be relied on to establish desired contact pressure of the semi-conductor against the rectifying whisker contacts rather than to rely on a screw or the like for advancing the semi-conductor against the contacts; and in both devices electrical test connection to the semi-conductor may be made via the clamps shown. It is important in both cases, however that leg 22 of the semi-conductor crystal support be firmly held in sliding contact during the adjustment of the crystal against the whisker contacts; for otherwise after proper contact is established, the unit might be wrecked as to performance during the welding, by transverse shift of the crystal relative to the whisker contacts. The firm sliding contact of leg 22 against plate 16 or pedestal 16' provides assurance against disturbing the characteristics established when, subsequently, the welding is effected.

From the foregoing it is apparent that semi-conductor devices may be constructed and processed in accordance with the principles of the present invention to provide "single-ended" constructions in a manner consistent with the requirements of ease of initial assembly and adjustment of the semi-conductor and point contact elements and adaptable to routine and orderly manufacture.

While in accordance with the provision of the statutes, I have illustrated and described the presently preferred forms of my invention, it will be apparent to those skilled in the art that changes may be made in the device and method disclosed without departing from the spirit of my invention as set forth in the appended claims and that in some cases certain features of my invention may be used to advantage without a corresponding use of other features.

What I claim is:

1. A semi-conductor device comprising a base, leads integrally molded with said base and projecting from opposite sides of said base, a whisker element arranged in a line of thrust directed away from said base and supported on one of said leads adjacent one side of said base, a pedestal on a further one of said leads adjacent said one side of said base and including an elongated guide surface offset from said line of thrust, a support bearing against and secured to said elongated guide surface, and a semi-conductor element carried by said support and including a prepared surface normal to and intersecting said line of thrust at a point at which said whisker element engages said prepared surface with a predetermined contact pressure.

2. A semi-conductor device comprising a base, on axially disposed lead integrally molded with said base and projecting from opposite sides of said base, a pair of axially-offset leads integrally molded in said base and projecting from opposite sides of said base, a pair of point contact elements arranged in a plane perpendicular to said base on one side thereof and supported on said pair of axially-offset leads with the points of said point contact elements directed away from said one side of said base, a pedestal carried by said axially disposed lead and including an elongated guide surface spaced from and parallel to said plane of said contact elements, a support abutting and secured to said guide surface, and a semi-conductor element carried by said support and including a prepared surface normal to and intersecting the plane of said contact elements at a point at which said contact elements engage said prepared surface with a predetermined contact pressure.

References Cited in the file of this patent

UNITED STATES PATENTS

| | | |
|---|---|---|
| 2,595,475 | McLaughlin | May 6, 1952 |
| 2,660,696 | James et al. | Nov. 24, 1953 |
| 2,691,750 | Shive | Oct. 12, 1954 |